(12) United States Patent
Ludwig et al.

(10) Patent No.: US 11,385,629 B2
(45) Date of Patent: Jul. 12, 2022

(54) PRODUCT CLOSING THE LOOP

(71) Applicant: Siemens Aktiengesellschaft, Munich (DE)

(72) Inventors: Hartmut Ludwig, West Windsor, NJ (US); Lingyun Wang, Princeton, NJ (US); Florian Erseh, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 147 days.

(21) Appl. No.: 16/482,322

(22) PCT Filed: Feb. 19, 2018

(86) PCT No.: PCT/US2018/018601
§ 371 (c)(1),
(2) Date: Jul. 31, 2019

(87) PCT Pub. No.: WO2018/152461
PCT Pub. Date: Aug. 23, 2018

(65) Prior Publication Data
US 2020/0012263 A1    Jan. 9, 2020

Related U.S. Application Data

(60) Provisional application No. 62/461,020, filed on Feb. 20, 2017.

(51) Int. Cl.
*G05B 19/418* (2006.01)
*G06Q 10/08* (2012.01)
*G06Q 50/04* (2012.01)

(52) U.S. Cl.
CPC .......... *G05B 19/41875* (2013.01); *G05B 2219/31394* (2013.01); *G05B 2219/31395* (2013.01); *G06Q 10/0875* (2013.01); *G06Q 50/04* (2013.01)

(58) Field of Classification Search
None
See application file for complete search history.

(56) References Cited

U.S. PATENT DOCUMENTS 6,400,999 B1 *   6/2002  Kashiyama ...... G05B 19/41865
                                                   700/100
2010/0082143 A1  4/2010  Pantaleano et al.
(Continued)

FOREIGN PATENT DOCUMENTS

CN    101788811 A    7/2010
CN    105976246 A    9/2016
(Continued)

OTHER PUBLICATIONS

C. Seitz, C. Legat and Z. Liu, "Flexible manufacturing control with autonomous product memories," 2010 IEEE 15th Conference on Emerging Technologies & Factory Automation (ETFA 2010), 2010, pp. 1-8, doi: 10.1109/ETFA.2010.5641185. (Year: 2010).*
(Continued)

*Primary Examiner* — Ryan A Jarrett (57) ABSTRACT

A system for managing physical assets in a manufacturing system includes a plurality of product controllers corresponding to physical assets in the manufacturing system. Each product controller is configured to store a desired product state for a physical asset and collect sensor data received from other digital companions. Furthermore, each product controller determines an actual product state based on the collected sensor data, as well as one or more actions to be performed on one or more physical assets in the manufacture system to yield the desired product state. Once the actions are determined, the product controller transmits control instructions for performing the one or more actions to one or more operation controllers in the manufacturing system.

16 Claims, 4 Drawing Sheets

(56) References Cited

U.S. PATENT DOCUMENTS

2014/0022093 A1* 1/2014 Hubauer .................. G01D 4/00
　　　　　　　　　　　　　　　　　　　　340/870.02
2016/0274558 A1　　9/2016 Strohmenger et al.

FOREIGN PATENT DOCUMENTS

| CN | 105988451 A | 10/2016 |
|---|---|---|
| EP | 3070547 A2 | 9/2016 |

OTHER PUBLICATIONS

International Search Report dated May 7, 2018; International Application No. PCT/US2018/018601; Filing Date: Feb. 19, 2018; 16 pages.
Chinese Report of Examination dated Sep. 15, 2021; Application No. 201880012174.6 ; 16 pages.

* cited by examiner

PRODUCT CLOSING THE LOOP

CROSS-REFERENCE TO RELATED APPLICATIONS

This application is a national phase filing under 35 U.S.C. § 371 of International Patent Application No. PCT/US2018/018601, filed Feb. 19, 2018, which claims the benefit of priority to U.S. Provisional Patent Application Ser. No. 62/461,020, filed Feb. 20, 2017, which are incorporated herein by reference in their entirety.

TECHNICAL FIELD

The present disclosure relates generally to using product information and multiple controllers to close the loop of information generated and used during a manufacturing process. The various systems and methods may be applied to industrial manufacturing applications, as well as various other applications where controllers are used.

BACKGROUND

In manufacturing systems, the physical production process is controlled outside of the digital world using technology such as control software running on a controller. A controller is a specialized computer control system configured to execute software which continuously gathers data on the state of input devices to control the state of output devices. Examples of controllers include programmable logic controllers, motion controllers, CNC, Smart I/O and drive controllers. A controller typically includes three major components: a processor (which may include volatile memory), volatile memory comprising an application program, and one or more input/output (I/O) ports for connecting to other devices in the automation system. Modern controllers use digital and analog inputs/outputs to sense and act on the physical objects in the real world.

Within the controller, the control program relies on the fact that it can sense the production state correctly, i.e., digital and physical world are in sync. However, due to lack of information about the production (product and machine) state this is often not the case. At the same time, the production process (how the product has to be produced) is engineered into the machine control program. Thus, a machine can manufacture only one product and needs to be re-engineered for the next one (change of the control program).

Figure 1:
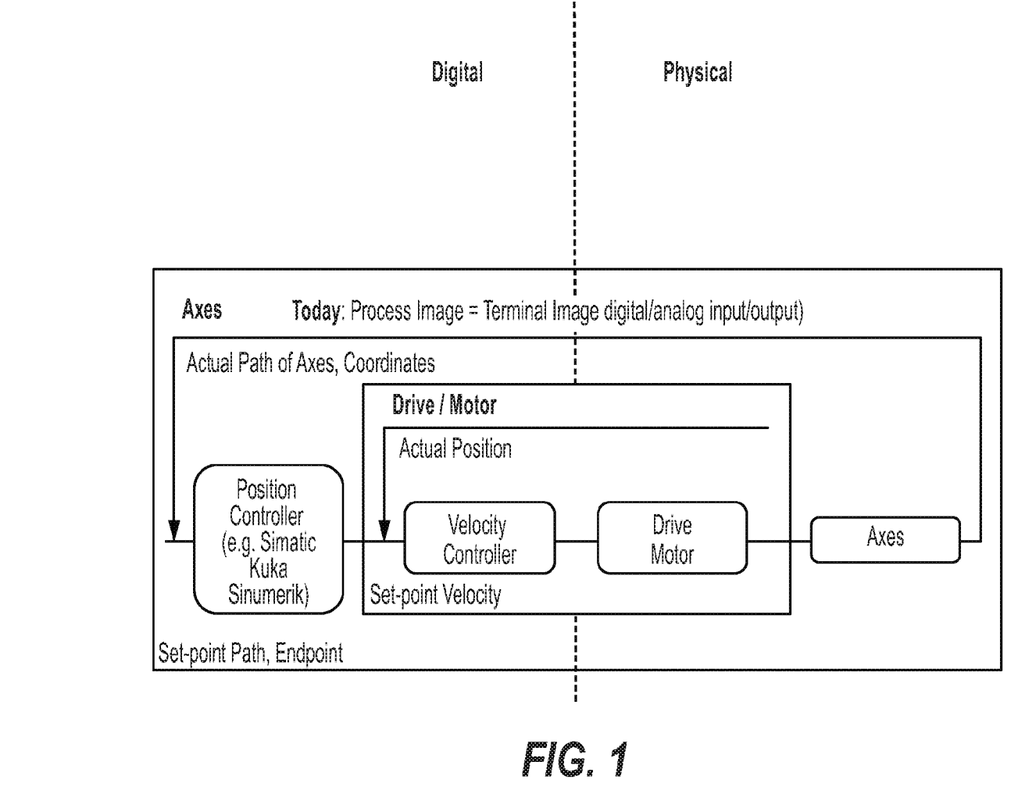
FIG. 1 shows the typical feedback control loop which is used today, to sync the digital and the physical world.

FIG. 1 shows the typical feedback control loop which is used today, to sync the digital and the physical world. The view to the physical objects (e.g., the state of machine equipment and product in the physical world) is actually limited to the information retrievable through digital/analog signals (e.g., a digitalized terminal). The objects in the physical world are indirectly controlled and sensed via motor speed and position information from motor angles.

To illustrate some drawbacks with the typical feedback control loop shown in FIG. 1, consider a simple assembly process where a robot fills boxes with badges. If the gripper fails, no badge will be placed in the box. However, note that there is no feedback to the controller. Therefore, the controller will not detect that the box is not filled completely. An incomplete box can also result from a human taking one of the badges out of a box. Both cases result in digital and physical world being out of sync, because the machine assumes the box is filled correctly, even though it is not. With conventional manufacturing systems, the problem can be partially solved by having an inspection station at the end of the production line.

Figure 2:
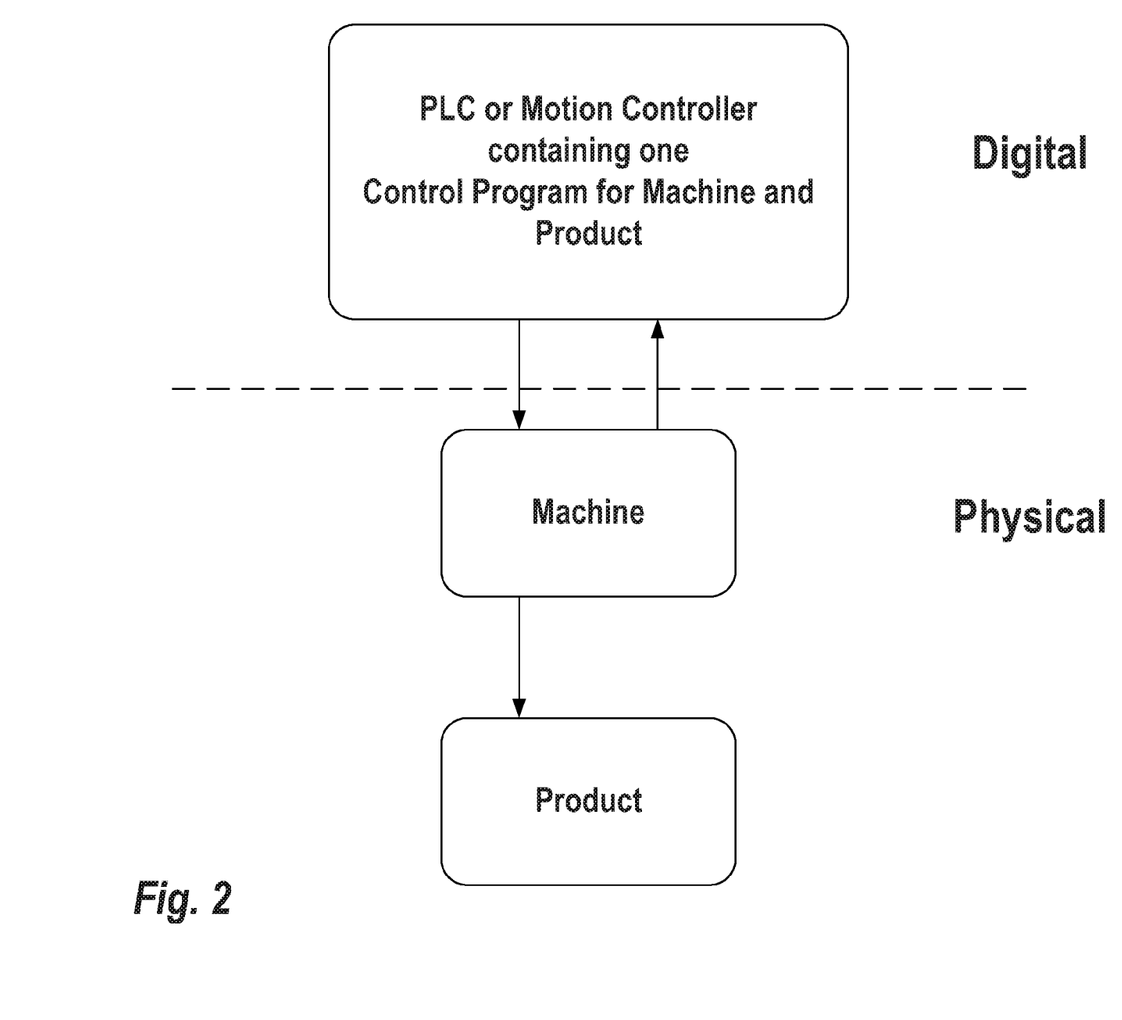
FIG. 2 illustrates a conventional control structure.

Another downside of conventional manufacturing systems is that that the control of the machine and production control logic is blended into one monolithic control program. That requires modifying and updating the control program whenever either the product or the machine changes, even if the other one does not. FIG. 2 illustrates a conventional control structure. Note that there typically is no feedback to the controller about the current state of the product.

SUMMARY

Embodiments of the present invention address and overcome one or more of the above shortcomings and drawbacks, by providing methods, systems, and apparatuses controlling a production process using two distinct controllers: a Product Controller (PC) and an Operation Controller (OC).

According to some embodiments, a system for managing physical assets in a manufacturing system includes a plurality of product controllers corresponding to physical assets in the manufacturing system. Each product controller is configured to store a desired product state for a physical asset and collect sensor data received from other digital companions. Furthermore, each product controller determines an actual product state based on the collected sensor data, as well as one or more actions to be performed on one or more physical assets in the manufacture system to yield the desired product state. Once the actions are determined, the product controller transmits control instructions for performing the one or more actions to one or more operation controllers in the manufacturing system.

Some embodiments of the aforementioned system further include a plurality of operation controllers that provide control instructions to the physical asset, and receive sensor data from sensors associated with the physical asset. These operation controllers may be executed, for example, in a control computer connected to a corresponding physical asset while the product controllers are either executed in the same location or remotely (e.g., on a cloud-based server). In one embodiment, the various controllers communicate with each other using a process image backbone that provides the plurality of operation controllers with uniform access to process image data items of each control computer in the manufacturing system.

Aside from the features described above, in some embodiments, each product controller is further configured to identify the actual product state as an anomalous product state and perform one or more corrective actions. These corrective actions may include, for example, invoking an emergency stop across all physical assets included in the production environment, rebooting a controller computer controlling a particular physical asset, or providing an alarm to one or more users via a human-machine interface.

According to another aspect of the present invention, as described in different embodiments, a method for managing physical assets in a manufacturing system includes creating a plurality of product controllers corresponding to physical assets in the manufacturing system and executing the plurality of product controllers. During execution, each product controller stores a desired product state for a physical asset and collects sensor data received from other digital companions. Each product controller additionally determines an actual product state based on the collected sensor data and actions to be performed on one or more physical assets in the manufacture system to yield the desired product state. Once the actions are determined, each product controller may transmit control instructions for performing the actions to one or more operation controllers in the manufacturing system.

According to other embodiments, a system for managing physical assets in a manufacturing system comprise a plurality of digital twins, a plurality of operation controllers, and a plurality of product controllers. The digital twins correspond to a plurality of physical assets in the manufacturing system. The operation controllers execute within a plurality of control computers. Each operation controller controls operation of a machine in the manufacturing system based on process image data stored in a corresponding control computer. The product controllers correspond to the digital twins. Each product controller is configured to collect sensor data from one or more sensors in the manufacturing system, determine an actual product state for a physical asset in the manufacturing system, and determine a desired product state based on the digital twin corresponding to the physical asset. If the actual product state deviates from the desired product state, the product controller sends instructions to one or more of the operation controllers to perform one or more actions on the physical asset.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawings embodiments that are presently preferred, it being understood, however, that the invention is not limited to the specific instrumentalities disclosed. Included in the drawings are the following Figures.

DETAILED DESCRIPTION

Systems, methods, and apparatuses are described herein which relate generally to controlling a production process using two distinct controllers: a Product Controller (PC) and an Operation Controller (OC). Each PC corresponds to a distinct product or other physical asset in the manufacturing system, while each OC controls a machine in the manufacturing system. The PC collects state information regarding its corresponding physical asset from sensors in the manufacturing system. In some embodiments, the PC also collects state information about the overall production process. Based on the collected state information, the PC identifies deviations of the actual state from the current state. The PC then issues instructions to one or more OCs to modify machine operations to help achieve the desired state of each physical asset in the manufacturing system. By separating the traditional control program into PC and OC, the product and its production process can be changed without reconfiguring any of the machines in the production lines (assuming the line can offer the needed behavior), by simply altering the PC for a changed product or introduction of a new PC for a different product. At the same time, the machines can be upgraded/changed/retrofitted without changing the product and or its production process.

Figure 3:
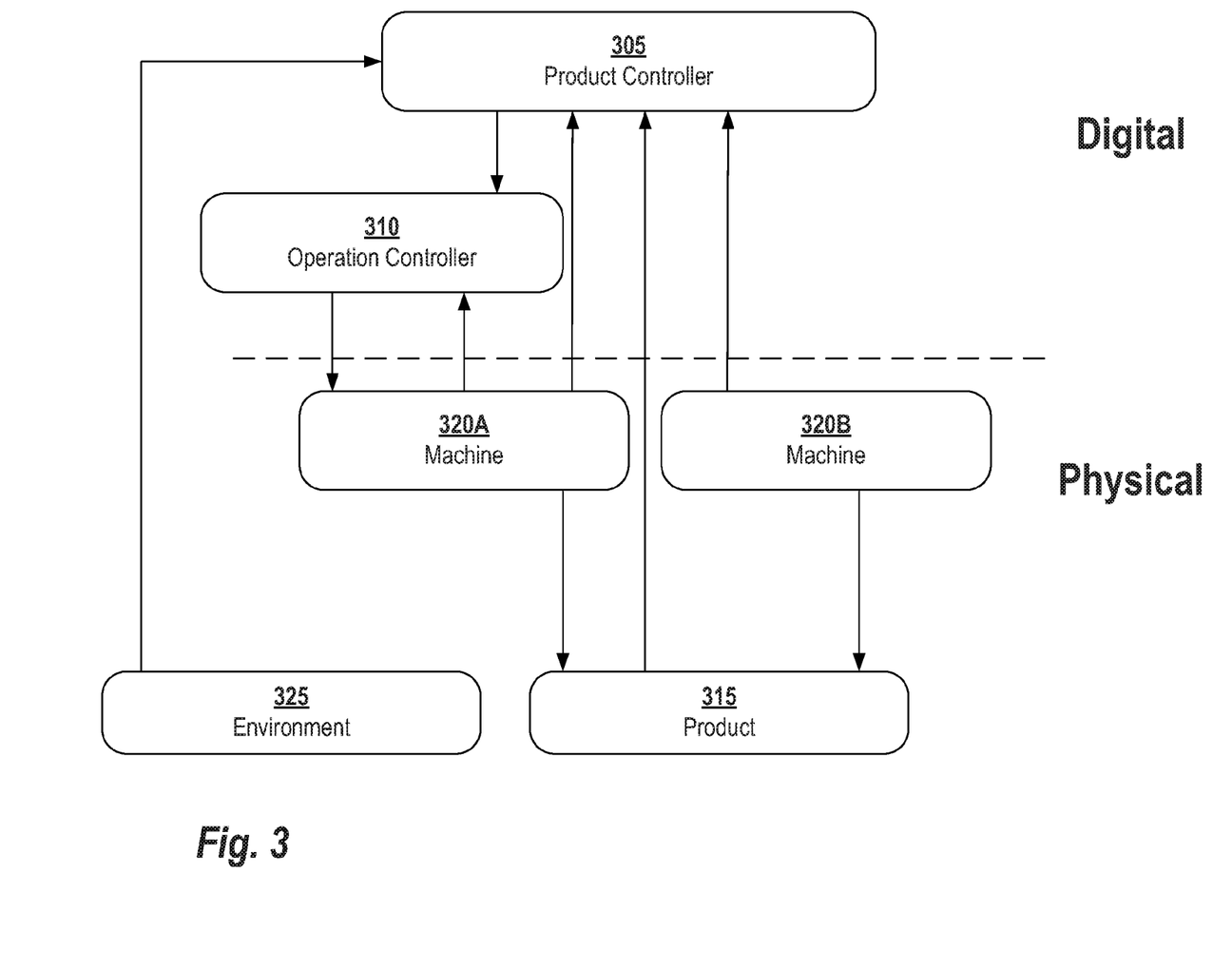
FIG. 3 provides a conceptual overview of a control structure using a Product Controller and an Operation Controller, according to some embodiments.

FIG. 3 provides a conceptual overview of a control structure using a Product Controller 305 and an Operation Controller 310. Although this example shows a single PC and a single OC, it should be understood that the control structure shown in FIG. 3 may be scaled to any number of OCs and PCs.

As shown in FIG. 3, the Product Controller 305 and the Operation Controller 310 are each digital entities. More specifically, each controller is a software application executable on various types of computing platforms. For example, in some embodiments, the Product Controller 305 is executed in a cloud-based server, remote from the manufacturing facility and the Operation Controller 310 is executed on a programmable logic controller (or other controller computer) within the manufacturing facility. In other embodiments, the Product Controller 305 and the Operation Controller 310 may execute within the same computing platform. It should be noted that the multiple PCs and OCs included in the system are each distinct entities; thus, in some embodiments, the various controllers execute in parallel during the operations using any type of parallel computing platform generally known in the art.

Continuing with reference to FIG. 3, a primary task of the Product Controller 305 is to keep the Product 315 in sync with a digital twin (stored either in the Product Controller 305 or on a computing system accessible to the Product Controller 305). As is generally understood in the art, the term digital twin refers to a digital version of a physical component of a system (e.g., a robot arm, a box, a work piece, etc.). The digital twin provides an abstraction of low-level functionality corresponding to the physical component. The techniques described herein utilize a digital twin for each physical asset in the manufacturing system. Thus, for the example shown in FIG. 3, Machines 320A and 320B, as well as the Product 315 would be associated with a digital twin.

Product development can be understood as existing in three lifecycle states: design, production, and operation. The activities performed by the Product Controller 305 vary according to the lifecycle state. Some examples of these activities are described in detail in the products that follow.

During the design state, the Product Controller 305 is created and the desired state of the product is established within the Product Controller 305. The term "desired state" refers to the overall condition of machine and may encompass information such as, for example, absolute position information, position information with reference to other physical assets, maximum temperature, maximum stress levels, etc. The desired state may be established using, for example, inputs such as a Bill of Process (BOP), Bill of Materials (BOM), properties of the materials, and 3D models (e.g., CAD models) or other physical models of the product. In some embodiments, aspects of the Product Controller 305 may be manually defined based on user input. In other embodiments, processing is partially or entirely automated. For example, in one embodiment, the Product Controller 305 includes text processing utilities for extracting relevant information from standard BOP and BOM documents, as well as model processing utilities for understanding physical models of the product or the manufacturing environment. Once the relevant information is extracted from the inputs, the information is then used to set values for the desired state of the physical asset managed by the Product Controller 305. In some embodiments, these values may be set based on a set of rules coded into the Product Controller 305. In other embodiments, the Product Controller 305 may include one or more machine learning models trained to generate inputs based on information similar to the extracted information.

During the production state, the Product Controller 305 continuously controls its production by sensing the actual state of the product by leveraging all available sensor information from the Machines 320A, 320B as well as sensor information from the Environment 325 (i.e., other sensors not directly connected to the Product 315). The Product Controller 305 compares the actual product state with desired state and identifies required machine behavior to realize desired state. Additionally, in some embodiments, the Product Controller 305 is configured to discovering and matching the available machine behavior offered by available machines. Finally, the Product Controller 305 may also decide and invoke the selected machine behavior to achieve a desired state. Based on required machine behavior, the Product Controller 305 generates a set of instructions that are provided to the Operation Controller 310. In some embodiments, the Product Controller 305 provides instructions directly executable by the Operation Controller 310.

During the operation state, the Product Controller 305 actively monitors the physical product using all available sensor information of the Environment 325. The control loop is similar to the one during the production state and has the task to repair, heal, and/or record any deviation between the desired state and the actual state of the Product 315. It should be noted that the desired state might be altered during operation leading to another production phase. For example, if a new product or machine is introduced into the manufacturing system, the desired state may be revised to reflect the impact of the new product or machine on the desired state of the Product 315.

It should be noted that the Product Controller 305 lives through the production phase and any subsequent phases (e.g., the maintenance/service/operation phase). Because the Product Controller 305 exists through the entire life cycle of the product, it is easy to trace back any issues from the production and even the product design.

As a practical example, consider a system filling boxes with badges using a robot arm. The PC of the box would use all available sensors (e.g., cameras providing birds-eye view, feedback from machines such as behavior completed, and physical model of the product itself) to derive the state of the product (e.g., which slots are empty/full). Additionally, the PC of the box would identify empty slots and discover machines offering the behavior to fill empty slots, and invoke machine behavior to fill empty slots (e.g., move gripper, open/close gripper). Failures (e.g., of the gripper) or human intervention (e.g., removing a badge) may be detected using the sensing capabilities of the product and corrected by the PC, without the need of an inspection station.

As a second practical example, consider the assembly of an automobile and, more specifically, the installation of a door onto the automobile's body. There is a PC corresponding to the automobile that knows the desired state of the automobile at the different steps during the assembly process. This state information may include, among other things, the position of the car door with respect to the automobile body. The automobile's PC then communicates with OCs of one or more robots in the assembly facility to complete assembly of the automobile.

In some embodiments, each product controller is further configured to detect that the actual product state is anomalous (i.e., it is "an anomalous product state"). For example, in some embodiments, the product controller may have a set of rules of identifying characteristics of anomalous states present in the actual state information. In other embodiments, the product controller analyzes trends of state information over a time period (e.g., hours or days). When state information deviates from the trend, it is identified as anomalous. In response to identifying the anomalous state, the product controller may perform one or more corrective actions. For example, in some embodiments, the product controller sends a signal to other devices in the computing system to invoke an emergency stop across all physical assets included in the production environment. In other embodiments, the product controller sends a signal to reboot a controller computer controlling one or more physical assets. In still other embodiments, the corrective actions may include providing a visual or auditory alarm to one or more users via a human-machine interface.

Returning to FIG. 3, the Operation Controller 310 is responsible to offer available behaviors and execute once selected. The Operation Controller 310 senses the actual behavior state of the machine and compares the actual with the desired state and decides on the needed machine activity. For example, for a robot arm this may entail opening or closing the gripper, or moving the arm to a different location. An additional task of the Operation Controller 310 may be invoking individual positioning commands for the axes during operations.

In some embodiments, the various operation controllers included in the manufacturing system communicate with each other using a process image backbone that provides the operation controllers with uniform access to process image data items of each control computer in the manufacturing system. The product controllers may also communicate with the operation controllers using this process image backbone. Additional detail regarding implementation of the process image backbone may be found in PCT Patent Application No. PCT/US17/23565, filed Mar. 22, 2017 and entitled "Universal Data Access Across Devices," the entirety of which is incorporated herein by reference.

Figure 4:
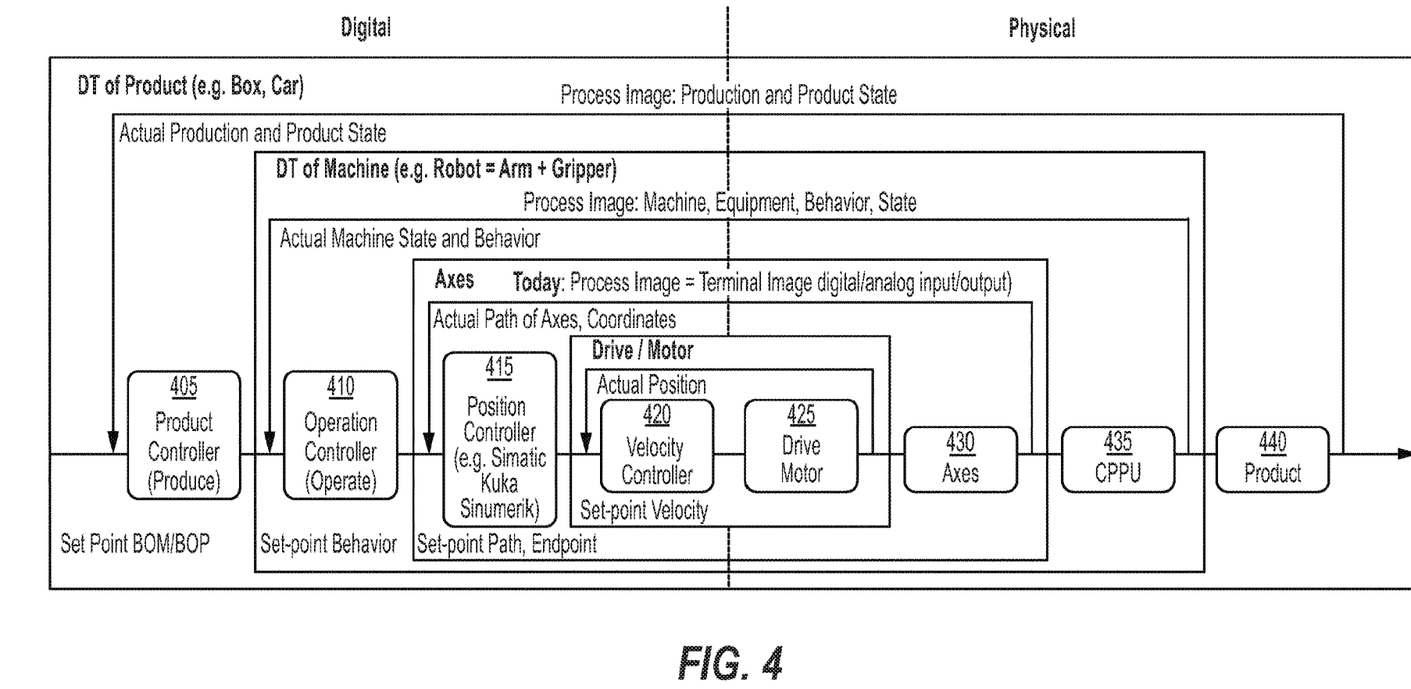
FIG. 4 shows a control loop with an Operation Controller and Position Controller in use, according to some embodiments.

FIG. 4 shows a control loop with an Operation Controller 410 and Position Controller 415 in use. The internal box labeled "Axes" represents the conventional control loop illustrated in FIG. 1. Briefly, the Position Controller 415 provides a set point to a Velocity Controller 420. The Velocity Controller 420 then provides instructions to the Drive Motor 425 which, in turn, updates the path of the Axes 430. The actual position values generated by the Drive Motor 425 are used as feedback to the Velocity Controller 420. The actual path of axes and other coordinates are used as feedback to the Position Controller 415.

Continuing with reference FIG. 4, a Product Controller 405 and an Operation Controller 410 are cascaded, such that the Product Controller 405 is the master of the Operation Controller 410, and the Operation Controller 410 is the master of the Position Controller 415. Note in this example, the Operation Controller 410 is associated with the digital twin of a machine, while the Product Controller is associated with the digital twin of a product. The Central Programming/Processing Unit (CPPU) 435 updates the process image data, thus providing updates to the Operation Controller 410. Once the machine operates on the Product 440, the actual production and product state (gathered via one or more sensors) is used to update the Product Controller 405, thus providing a loop from the action performed on the Product 440 back to the initial stage in the pipeline.

To illustrate the techniques, consider a machine manufacturing a product. The PC monitors the health of itself. Additionally, the PC detects, and potentially corrects, any deviation between the desired state (as stored in the digital twin) and the corresponding physical asset. During this period, the OC offers and executes its behavior. The behavior is triggered by products within the production line.

As a second example, an emerging machine during its manufacturing can be seen as a product during production. As such, the emerging machine has the PC controlling the production of this machine, using the behavior (OC) of itself, if available, or other machines The OC starts to offer behaviors once they are produced. It should be noted that an OC is optional; not all manufactured products will have one. For example, a work piece or box would have a PC, but not an OC.

The processors described herein as used by embedded controllers may include one or more central processing units (CPUs), graphical processing units (GPUs), or any other processor known in the art. More generally, a processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

Various devices described herein including, without limitation to the embedded controllers and related computing infrastructure, may include at least one computer readable medium or memory for holding instructions programmed according to embodiments of the invention and for containing data structures, tables, records, or other data described herein. The term "computer readable medium" as used herein refers to any medium that participates in providing instructions to one or more processors for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks. Non-limiting examples of volatile media include dynamic memory. Non-limiting examples of transmission media include coaxial cables, copper wire, and fiber optics, including the wires that make up a system bus. Transmission media may also take the form of acoustic or light waves, such as those generated during radio waves and infrared data communications.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically, wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for."

We claim:

1. A system for managing physical assets in a manufacturing system, the system comprising:
   a plurality of product controllers, each product controller corresponding to a distinct physical assets or a product in the manufacturing system, wherein each product controller is configured to:
   vary its activities according to a lifecycle state of the corresponding physical asset or product including design, production and operation lifecycle states;
   in the product controller, determine and store a desired product state for a physical asset determined during the design state, wherein determining the desired product state comprises setting a set of values defining the product state based on information from inputs, the inputs determined using a machine learning model;
in the product controller, collect sensor data received from one or more sensors in the manufacturing system,
in the product controller, determine an actual product state based on the collected sensor data and compare the actual product state to the desired product state;
in the product controller, generate control instructions based on the comparison;
in the product controller, determine one or more actions to be performed on one or more physical assets in the manufacture system to yield the desired product state during the production state; and
in the product controller, transmit the control instructions for performing the one or more actions to one or more operation controllers in the manufacturing system and
a plurality of operation controllers configured to:
provide control instructions to the physical asset, and
receive sensor data from sensors associated with the physical asset,
wherein each operation controller is associated to at least one of the product controllers in a cascaded configuration the product controller acting as a master to the operation controller.

2. The system of claim 1, wherein each operation controller is executed in a control computer connected to a corresponding physical asset.

3. The system of claim 1, wherein the plurality of operation controllers communicate with each other using a process image backbone that provides the plurality of operation controllers with uniform access to process image data items of each control computer in the manufacturing system.

4. The system of claim 1, wherein the plurality of product controllers are stored on a cloud-based server remote from the manufacturing system.

5. The system of claim 1, wherein each product controller is further configured to:
identify the actual product state as an anomalous product state; and
in response to identifying the anomalous state, perform one or more corrective actions.

6. The system of claim 5, wherein the corrective actions comprise invoking an emergency stop across all physical assets included in the production environment.

7. The system of claim 5, wherein the corrective actions comprise rebooting a controller computer controlling a particular physical asset.

8. The system of claim 5, wherein the corrective actions comprise providing an alarm to one or more users via a human-machine interface.

9. The system of claim 1, wherein the desired product state for each physical asset is defined based on one or more of a Bill of Materials (BOM), a Bill of Process (BOP) or a physical model of the physical asset.

10. The system of claim 1, wherein the desired product state for each physical asset is updated during operation of the manufacturing system.

11. The system of claim 10, wherein updating of the desired product state is triggered based on detection of one or more new physical assets into the manufacturing system.

12. A method for managing physical assets in a manufacturing system, the method comprising:
creating a plurality of product controllers, each product controller corresponding to a distinct physical asset or product in the manufacturing system;
executing the plurality of product controllers, wherein during execution each product controller performs operations comprising:
varying activities performed by the product controller according to a lifecycle state of the corresponding physical asset or product including design, production and operation states;
storing a desired product state for a physical asset or product during the design state, wherein the desired product state is determined by setting a set of values based on information from inputs determined using a machine learning model;
collecting sensor data received from one or more sensors in the manufacturing system,
determining an actual product state based on the collected sensor data;
determining one or more actions to be performed on one or more physical assets in the manufacture system to yield the desired product state; and
transmitting control instructions for performing the one or more actions to one or more operation controllers in the manufacturing system and
executing a plurality of operation controllers on a plurality of control computers, wherein each operation controller performs operations comprising:
provide control instructions to a physical asset, and
receive sensor data from sensors associated with the physical asset
wherein each operation controller is associated to at least one of the product controllers in a cascaded configuration the product controller acting as a master to the operation controller.

13. The method of claim 12, wherein the plurality of product controllers are executed in parallel on a parallel computing platform.

14. A system for managing physical assets in a manufacturing system, the system comprising:
a plurality of digital twins corresponding to a plurality of physical assets in the manufacturing system;
a plurality of operation controllers executing within a plurality of control computers, wherein each operation controller controls operation of a machine in the manufacturing system based on process image data stored in a corresponding control computer;
a plurality of product controllers corresponding to the plurality of digital twins, wherein each product controller is configured to:
vary its activities according to a lifecycle state of a product associated with the product controller;
during a design stage, determining a desired product state by setting values determined by inputs identified using a machine learning model;
in the product controller, collect sensor data from one or more sensors in the manufacturing system,
in the product controller, determine an actual product state for a physical asset in the manufacturing system,
in the product controller, determine a desired product state based on the digital twin corresponding to the physical asset, and
if the actual product state deviates from the desired product state, the product controller providing instructions to one or more of the operation controllers to perform one or more actions on the physical asset.

15. The system of claim 14, wherein the plurality of operation controllers communicate with each other using a process image backbone that provides the plurality of operation controllers with uniform access to process image data items of each control computer in the manufacturing system.

16. The system of claim 15, wherein the plurality of product controllers community with the plurality of operation controllers using the process image backbone.

\* \* \* \* \*